Aug. 3, 1965  R. J. HULTGREN  3,198,438
SPRAYER CONSTRUCTION
Filed March 12, 1964

INVENTOR.
RALPH J. HULTGREN
JULIAN GUTIERREZ
BY
Merchant, Merchant & Gould
ATTORNEYS

United States Patent Office 3,198,438
Patented Aug. 3, 1965

3,198,438
SPRAYER CONSTRUCTION
Ralph J. Hultgren, 4724 Quail Ave. N., Minneapolis, Minn., and Julian Gutierrez, Edina, Minn.; said Gutierrez assignor to said Hultgren
Filed Mar. 12, 1964, Ser. No. 351,375
5 Claims. (Cl. 239—318)

This invention pertains to sprayers generally of the type adapted to be connected to a hose for watering lawns or flowers and wherein an insecticide or liquid fertilizer is automatically mixed with the water stream.

In particular the invention pertains to sprayers of this character wherein the chemical to be mixed with the water stream is contained in a disposable collapsible container or cartridge having an aspirating tube extending into the water stream and further containing means for applying the stream water pressure to the outer surfaces of the collapsible container to force the liquid chemical through the aspirating tube into the water stream.

Prior art sprayers of this general type have a disadvantage in that the collapsible containers containing the liquid chemical are usually difficult to insert in the spray; are difficult to remove after the chemical has been used with the result that the person replacing the disposable container comes into physical contact with the chemical; and are difficult to store since for proper operation the disposable containers should be highly resilient.

The present invention overcomes the above difficulties by providing a disposable liquid chemical container wherein the liquid chemical is contained in a highly resilient rubber or plastic collapsible container which in turn is mounted inside of a rigid container, the rigid container having an aspirating tube extending through the front end thereof into the collapsible container. The rigid container further has a plurality of apertures through its front and rear ends so as to allow water from the water stream to apply pressure to the outer surface of the collapsible container.

It is one object of this invention, therefore, to provide an improved sprayer wherein a first liquid is mixed into a stream of a second liquid.

Another object of this invention is to provide an improved disposable liquid chemical container for use with sprayers.

A further object of this invention is to provide a disposble liquid chemical container for a sprayer wherein the liquid chemical is contained in a highly resilient collapsible container which in turn is mounted in a rigid container.

A still further object of this invention is to provide a disposable liquid chemical container for a sprayer wherein the liquid chemical is contained in a collapsible container which in turn is mounted in a rigid container and wherein an aspirating tube extends through the rigid container into the collapsible container in such a manner that the aspirating tube is readily replaced by one having a different size bore.

These and other objects of the invention will become apparent to those skilled in the art upon consideration of the accompanying specification, claims and drawings of which:

Figure 1:
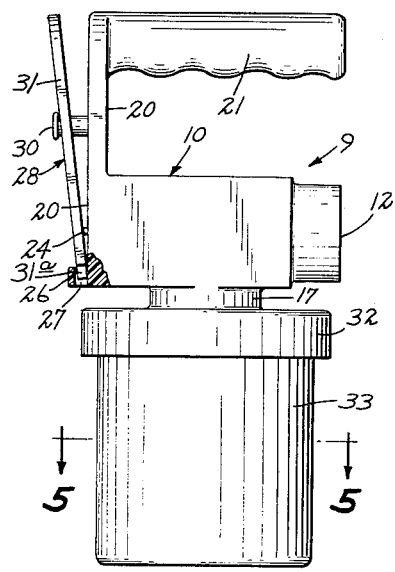
FIG. 1 is a view in side elevation, a portion thereof being broken away and shown in section.
Figures 2, 3:
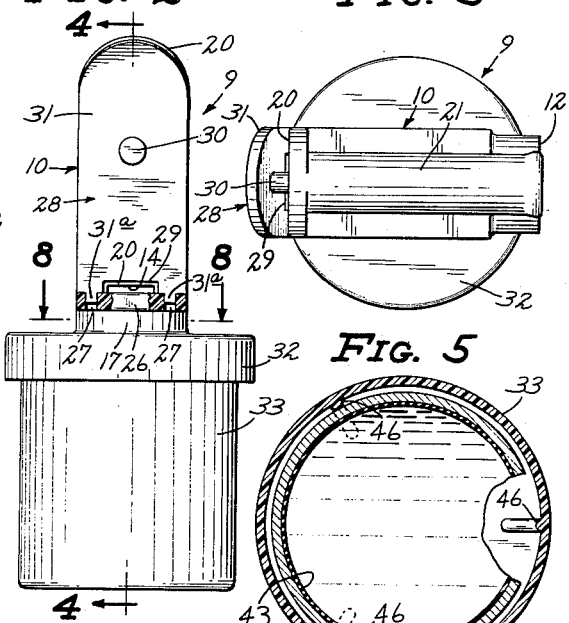
FIG. 2 is a view in front elevation with portions thereof being broken away and shown in section.
FIG. 3 is a view in top plan.
Figure 5:
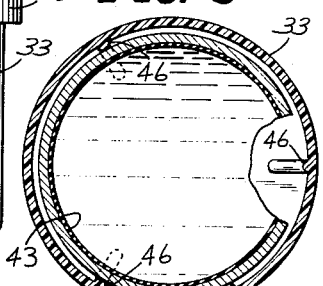
FIG. 5 is a view in horizontal section on an enlarged scale as seen from the line 5—5 of FIG. 1, portions thereof being broken away.

Referring to the figures there is shown a sprayer 9 having a head assembly 10. Head assembly 10 has a mixing conduit or passageway 11 therethrough, the mixing conduit having an inlet end 12, an intermediate portion 13, and a restricted outlet orifice or outlet end 14. Inlet end 12 is internally threaded and is adapted to be connected to a source of liquid under pressure as, for example, the end of a normal garden hose, not shown.

Inlet end 12 is connected by means of an orifice 15 to the intermediate portion 13 of the mixing conduit. Intermediate portion 13 of the mixing conduit has a plurality of apertures 16 through the bottom wall 17 thereof, and adjacent apertures 16 and substantially centrally located in the bottom wall 17 of intermediate portion 13 is an aperture 18.

The restricted orifice, or outlet end, 14 extends through the front wall 20 of mixing conduit 11 into the intermediate portion 13. The front wall 20 of mixing conduit 11 extends vertically and a handle 21 extends parallel to conduit 11 from the upper rear surface of the extended end of wall 20.

A pressure valve 22 comprises a tapered resilient cylindrical plug 23 rigidly mounted on one end of a rod 24, the largest diameter of plug 23 being greater than the diameter of orifice 15. Valve 22 is positioned so that the plug 23 blocks orifice 15, the rod 24 extending through the intermediate portion 13 of mixing conduit 11 and through an aperture 25 in the front wall 20 of conduit 11, the end of rod 24 extending slightly beyond the front face of wall 20.

Figure 4:
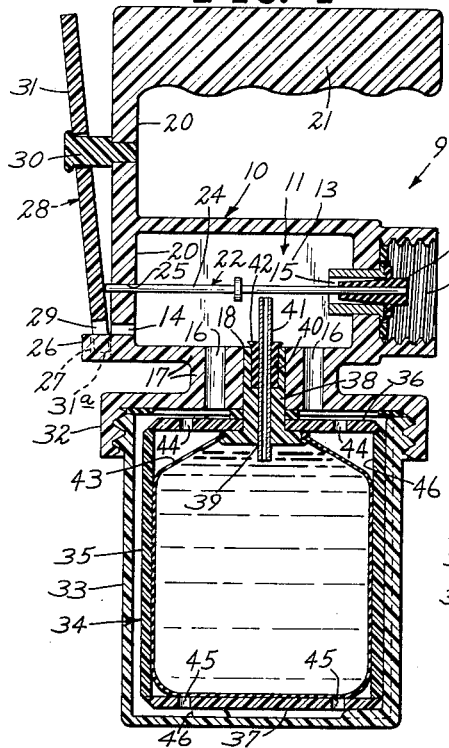
FIG. 4 is an enlarged view in vertical section as seen from the line 4—4 of FIG. 2.
Figure 6:
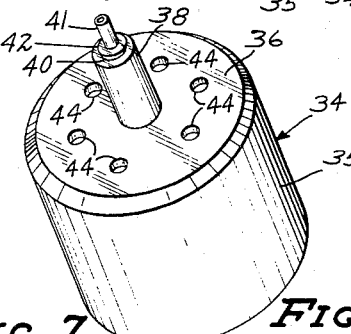
FIG. 6 is a view in perspective of a disposable container used in the structure of FIG. 4.
Figures 7, 8:
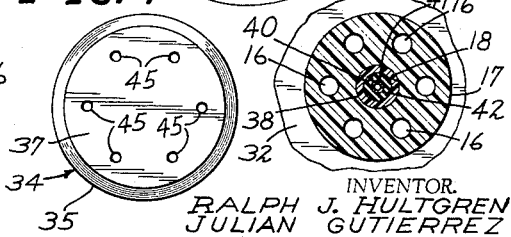
FIG. 7 is a view in bottom plan of the structure of FIG. 6.
FIG. 8 is an enlarged view in horizontal section as seen from the line 8—8 of FIG 2.

A lip 26 having laterally spaced apertures 27 therethrough extends outwardly from the bottom of front wall 20 of conduit 11. A trigger mechanism 28, for valve 22, comprises a stud 30 fast on the wall 20 intermediate the conduit 11 and handle 21 and extending outwardly from the front face thereof; stud 30 having a plate 31 slidably mounted theron. The bottom edge of plate 31 is provided with the ears 31a one each of which resides in one of the apertures 27 of lip 26, the width of plate 31, as indicated in FIG. 4, being less than the width of aperture 27 so that ears 31a of plate 31 has a limited pivotal movement in aperture 27. Plate 31 has an orifice 29 therethrough; orifice 29 being coaxial with and adjacent to the orifice 14 of mixing conduit 11.

Bottom wall 17 has a circular flange portion 32, flange portion 32 being coaxial with the aperture 18 in bottom wall 17. The flange portion 32 of bottom wall 17 is internally threaded. A cup-like casing 33 has its upper end open and its externally threaded at its upper edge, casing 33 being threadably engaged with the flange portion 32 of head assembly 10 of sprayer 9. Casing 33 has a plurality of rib portions 46 extending longitudinally along the inside wall thereof, each rib having a foot portion extending along the bottom of casing 33.

A disposable rigid container 34 comprises a rigid side wall 35 and opposite end walls 36, 37. Container 34 has an extension 38 projecting from the end wall 36, extension 38 having a longitudinal bore 39 therethrough, longitudinal bore 39 opening into the container 34. Extension 38 further has a counterbore 40 at the extended end thereof.

An aspirating tube 41, having an outside diameter slightly less than the diameter of bore 39, is positioned in the bore 39 of extension 38 and extends into the rigid container 34.

A compressible collar 42 is force fit on the aspirating tube 41 and is positioned intermediate the ends of tube 41, the outside diameter of collar 42 being slightly larger than the diameter of the counterbore 40. Collar 42 is force fit into the counterbore 40 of extension 38. In the event that it is necessary or desirable to change the rate of flow of the liquid chemical from the collapsible container to the water stream, this can be readily accomplished by removing the collar and aspirating tube from counterbore 40 and inserting another aspirating tube having a different diameter bore.

A highly resilient collapsible container 43, such as a plastic or rubber container, is mounted inside of the rigid container 34 and is attached to encompass the bore opening of extension 38. Aspirating tube 41 extends into the collapsible container 43. Collapsible container 43 contains a liquid chemical, such as an insecticide or liquid chemical fertilizer, which it is desired to mix with a water stream passing through mixing conduit 11 of sprayer head 10. Rigid container 34 has a plurality of apertures 44 through the end 36 thereof and a plurality of apertures 45 through the end 37 thereof.

Rigid container 34 is positioned inside of casing 33 and casing 33 is threadably engaged with the flange portion 32 of spray head 10, the extension 38 of rigid container 34 being positioned through aperture 18 of the bottom wall 17 of spray head 10. The extended end of the aspirating tube 41 extends into intermediate portion 13 of mixing conduit 11. Rigid container 34 is supported by the ribs and feet 46.

In operation, the inlet end 12 of mixing conduit 11 of sprayer head 10 is attached to a suitable source of liquid under pressure, for example, to the end of a lawn or garden hose. The pressure from the hose, not shown, acts against plug 23 of valve 22 and blocks orifice 15 so that no water is allowed in the intermediate portion 13 of mixing conduit 11. When the trigger mechanism 28 is actuated by pulling plate 31 toward the handle 21, the plate 31 pushes against the end rod 24 extending through aperture 25 thereby forcing plug 23 out of orifice 15 and allowing the water stream to pass through orifice 15, mixing chamber 13, orifice 14, and orifice 29.

The flow of water through mixing chamber 13 creates a suction which tends to draw the liquid chemical in collapsible container 43 through the aspirating tube 41 into the water stream. In addition, water flows through apertures 16 in the bottom wall 17 of the sprayer head 10 and through the apertures 44 in the end 36 of rigid container 34 and apertures 45 in the end 37 of rigid container 34. Since rigid container 34 is supported away from the inside wall of casing 33 by means of ribs and feet 46, the water is free to flow around the rigid container 34 and through the apertures 45 in end 37 of rigid container 34. This water flow into rigid container 34 creates a pressure on the outer surfaces of collapsible container 43 thereby forcing the liquid chemical inside of collapsible container 43 up through the aspirating tube 41 and into the water stream.

While the invention has been described with reference to a sprayer for mixing liquid chemicals with a water stream, if should be apparent that the same principle could be applied to a paint sprayer wherein the inlet end 12 of the mixing conduit would be connected to suitable source of air pressure and the paint would contained in the collapsible containers 43.

It is to be understood that while we have shown a specific embodiment of our invention, this is for the purpose of illustration only and that our invention is to be limited solely by the scope of the appended claims.

What is claimed is:
1. Apparatus of the class described comprising:
(a) a mixing conduit having an inlet end adapted to be connected to a supply source of liquid under pressure, an intermediate portion having first and second adjacent apertures therethrough, and an outlet end;
(b) a pressure valve mounted in the inlet end of said mixing conduit to block the flow of liquid therethrough, said valve being held in a normally closed position by the inlet liquid pressure;
(c) a trigger mechanism connected to said pressure valve to operate said valve to an open position;
(d) a rigid container having an extension at its front end, said extension having a longitudinal bore therethrough opening into said container and a counterbore at its extended end, said rigid container further having a plurality of apertures through the front and rear ends thereof;
(e) a highly resilient collapsible container mounted inside said rigid container and attached to encompass the bore opening of said extension, said collapsible container containing a different liquid than the pressurized liquid source;
(f) an aspirating tube having an outside diameter slightly less than the diameter of said bore and having a compressible collar interposed between its ends, said collar having an outside diameter slightly larger than the diameter of said counterbore, said aspirating tube being positioned in the bore of said extension and extending into said collapsible container, the collar of said aspirating tube being force fit into the counterbore of said extension; and
(g) a casing having one end thereof open and having said rigid container positioned therein, said casing engaging said mixing conduit to form a liquid-tight seal therebetween and to position the extension of said rigid container through one of the adjacent apertures of the intermediate portion of said mixing conduit.

2. Apparatus of the class described comprising:
(a) a mixing conduit having an inlet end adapted to be connected to a supply source of liquid under pressure, an intermediate portion having first and second adjacent apertures therethrough, and an outlet end;
(b) a rigid container having an extension at its front end, said extension having a longitudinal bore therethrough opening into said container and a counterbore at its extended end, said rigid container further having a plurality of apertures through the front and rear ends thereof;
(c) a collapsible container mounted inside said rigid container and attached to encompass the bore opening of said extension, said collapsible container containing a different liquid than the presurized liquid source;
(d) an aspirating tube having an outside diameter slightly less than the diameter of said bore and having a compressible collar interposed between its ends, said collar having an outside diameter slightly larger than the diameter of said counterbore, said aspirating tube being positioned in the bore of said extension and extending into said collapsible container, the collar of said aspirating tube being force fit into the counterbore of said extension; and
(e) a casing having one end thereof open and having said rigid container positioned therein, said casing engaging said mixing conduit to form a liquid-tight seal therebetween and to position the extension of said rigid container through one of the adjacent apertures of the intermediate portion of said mixing conduit.

3. Apparatus of the class described comprising:
(a) a mixing conduit having an inlet end adapted to be connected to a supply of liquid under pressure, an intermediate portion having first and second adjacent apertures therethrough, and an outlet end;
(b) a pressure valve mounted in the inlet end of said mixing conduit to block the flow of liquid therethrough, said valve being held in a normally closed position by the inlet liquid pressure;

(c) a trigger mechanism connected to said pressure valve to operate said valve to an open position;

(d) a rigid container having a tubular extension at its front end, said extension opening into said container, said container further having an aperture through the front end thereof;

(e) a collapsible container mounted inside said rigid container and attached to encompass the opening of said extension; and (f) a casing having one end thereof open and having said rigid container positioned therein, said casing engaging said mixing conduit to form a liquid-tight seal therebetween and to position the extension of said rigid container through one of the adjacent apertures of the intermediate portion of said mixing conduit.

4. Apparatus of the class described comprising:

(a) a mixing conduit having an inlet end adapted to be connected to a supply source of liquid under pressure, an intermediate portion having first and second adjacent apertures therethrough, and an outlet end;

(b) a rigid container having an aspirating tube extending from the front face thereof, said aspirating tube opening into said rigid container, said rigid container further having apertures through each the front and rear ends thereof;

(c) a collapsible container mounted inside said rigid container and attached to encompass the opening of said aspirating tube, said collapsible container containing a different liquid than the pressurized liquid source; and (d) a casing having one end thereof open and having said rigid container positioned therein, said casing engaging said mixing conduit to form a liquid-tight seal therebetween and to position the extended aspirating tube of said rigid container through one of the adjacent apertures of the intermediate portion of said mixing conduit.

5. Apparatus of the class described comprising:

(a) a sprayer having a first passageway therethrough, said first passageway having a restricted outlet orifice and a threaded inlet adapted to be attached to the end of a garden hose, said sprayer having a second passageway extending into said first passageway;

(b) a rigid container having a tubular extension at its front end, said extension opening into said container, said container further having an aperture through the front end thereof;

(c) a collapsible container mounted inside said rigid container and attached to said tubular extension; and (d) a casing having one end thereof open and having said rigid container positioned therein, said casing engaging said sprayer to form a water-tight seal therebetween and to position the tubular extension of said rigid container through the second passageway of said sprayer.

References Cited by the Examiner

UNITED STATES PATENTS

| | | | |
|---|---|---|---|
| 339,206 | 4/86 | Phelan | 239—373 |
| 560,225 | 5/96 | Mills | 239—365 |
| 1,953,330 | 4/34 | Andres | 239—365 |
| 1,981,077 | 11/34 | Shields | 239—373 |
| 2,153,240 | 4/39 | Dailey et al. | 239—310 |
| 2,610,433 | 9/52 | Chisholm et al. | 239—365 |
| 3,018,970 | 1/62 | Wittenberg et al. | 239—323 |
| 3,084,712 | 4/63 | Brown | 137—564.5 |
| 3,122,324 | 2/64 | Lee | 239—318 |
| 3,122,325 | 2/64 | Mahrt | 239—318 |
| 3,123,248 | 3/64 | Webb | 220—63 |
| 3,125,241 | 3/64 | Kasper | 220—63 |

EVERETT W. KIRBY, *Primary Examiner.*